United States Patent
Iyer et al.

(10) Patent No.: US 8,956,784 B2
(45) Date of Patent: Feb. 17, 2015

(54) REDUCED-WEIGHT FUEL CELL PLATE WITH CORROSION RESISTANT COATING

(75) Inventors: Vijay M. Iyer, Mountain View, CA (US); Jean L. Lee, San Jose, CA (US); Gregory L. Tice, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 635 days.

(21) Appl. No.: 12/759,933

(22) Filed: Apr. 14, 2010

(65) Prior Publication Data
US 2011/0256465 A1 Oct. 20, 2011

(51) Int. Cl.
*H01M 2/20* (2006.01)
*H01M 4/64* (2006.01)
*H01M 4/66* (2006.01)
*H01M 8/00* (2006.01)
*H01M 8/02* (2006.01)
*H01M 8/24* (2006.01)
*B23K 31/02* (2006.01)

(52) U.S. Cl.
CPC .............. *B23K 31/02* (2013.01); *H01M 8/2465* (2013.01); *H01M 8/0245* (2013.01); *Y02E 60/50* (2013.01); *H01M 2250/30* (2013.01); *Y02B 90/18* (2013.01)

USPC ........... 429/520; 429/467; 429/468; 429/469; 429/522; 429/535

(58) Field of Classification Search
USPC .................. 429/467, 469, 468, 520, 522, 535; 228/176
See application file for complete search history.

(56) References Cited

U.S. PATENT DOCUMENTS

| | | | |
|---|---|---|---|
| 5,776,624 A * | 7/1998 | Neutzler | 429/437 |
| 2004/0151952 A1 * | 8/2004 | Brady et al. | 429/12 |
| 2005/0095492 A1 * | 5/2005 | Frank et al. | 429/35 |
| 2007/0243452 A1 * | 10/2007 | Weidman et al. | 429/44 |

* cited by examiner

*Primary Examiner* — Sean P Cullen
(74) *Attorney, Agent, or Firm* — Brownstein & Hyatt Farber Schreck, LLP (57) ABSTRACT

The disclosed embodiments provide a fuel cell plate. The fuel cell plate includes a substrate of electrically conductive material and a first outer layer of corrosion-resistant material bonded to a first portion of the substrate. To reduce the weight of the fuel cell plate, the electrically conductive material and the corrosion-resistant material are selected to be as light as practicable.

18 Claims, 6 Drawing Sheets

REDUCED-WEIGHT FUEL CELL PLATE WITH CORROSION RESISTANT COATING

BACKGROUND

1. Field

The present embodiments relate to power sources for electronic devices. More specifically, the present embodiments relate to techniques for reducing the weight of fuel cells for use with portable electronic devices.

2. Related Art

Fuel cells provide electrical power by converting a source fuel, such as hydrogen or a hydrogen-containing compound, into an electric current and a waste product by electrochemical means. In particular, a fuel cell contains an anode, a cathode, and an electrolyte between the anode and cathode. Electricity may be generated by two chemical reactions within the fuel cell. First, a catalyst at the anode oxidizes the fuel to produce positively charged ions and electrons. The electrolyte may allow ions from the oxidation process to pass through to the cathode while blocking passage of the electrons. The electrons may thus be used to drive a load connected to the fuel cell before recombining with the ions and a negatively charged atom (e.g., oxygen) at the cathode to form a waste product such as carbon dioxide and/or water.

Because fuel cells are typically associated with low voltages (e.g., 0.5-0.7 volts), multiple fuel cells may be combined to form a fuel cell stack. For example, a fuel cell stack may contain a number of stacked bipolar plates. Each bipolar plate may provide an anode on one side and a cathode on the other side. To form fuel cells within the stack, the catalyst and the electrolyte may be placed in between the bipolar plates. The fuel cells may then be connected in series to increase the voltage of the fuel cell stack.

However, existing fuel cell stack architectures may have a number of disadvantages. First, each fuel cell may represent a single point of failure in a series-connected fuel cell stack. In addition, a fuel cell may be subject to a number of failure modes, including accumulation of nitrogen in the anode, poisoning of the catalyst, degradation of the electrolyte, and/or water flooding in the anode or cathode. Consequently, the reliability of a fuel cell stack may decrease as the number of fuel cells in the fuel cell stack increases.

Second, bipolar plates for fuel cell stacks are typically manufactured using materials that are both conductive and corrosion-resistant, such as stainless steel. However, the high density of such materials may result in heavy bipolar plates that restrict the use of fuel cell stacks in portable applications. For example, adoption of a fuel cell stack design as a power source for portable electronic devices may be hampered by the weight of the resulting fuel cell stack, the majority of which is in stainless steel bipolar plates.

Hence, the use of fuel cells as power sources may be facilitated by improvements in the reliability, weight, and/or size of fuel cell stacks.

SUMMARY

The disclosed embodiments provide a fuel cell plate. The fuel cell plate includes a substrate of electrically conductive material and a first outer layer of corrosion-resistant material bonded to a first portion of the substrate. To reduce the weight of the fuel cell plate, both the electrically conductive material and the corrosion-resistant material are selected to be as light as practicable.

In some embodiments, the fuel cell plate also includes a second outer layer of solderable material bonded to a second portion of the substrate.

In some embodiments, the first outer layer and the second outer layer are simultaneously bonded to the substrate using a cladding technique.

In some embodiments, the fuel cell plate also includes a coating of corrosion-resistant solderable material over the second outer layer.

In some embodiments, the second portion of the substrate and the second outer layer correspond to a solder tab for the fuel cell plate.

In some embodiments, the fuel cell plate also includes a corrosion-resistant sealant applied to an exposed edge of the substrate.

In some embodiments, the corrosion-resistant sealant is applied using a welding technique, a molding technique, or a coating technique.

In some embodiments, the first outer layer is bonded to the first portion of the substrate using a cladding technique, a sputtering technique, a spraying technique, a plating technique, or a coating technique.

In some embodiments, the first portion of the substrate and the first outer layer correspond to an electrode for a fuel cell.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
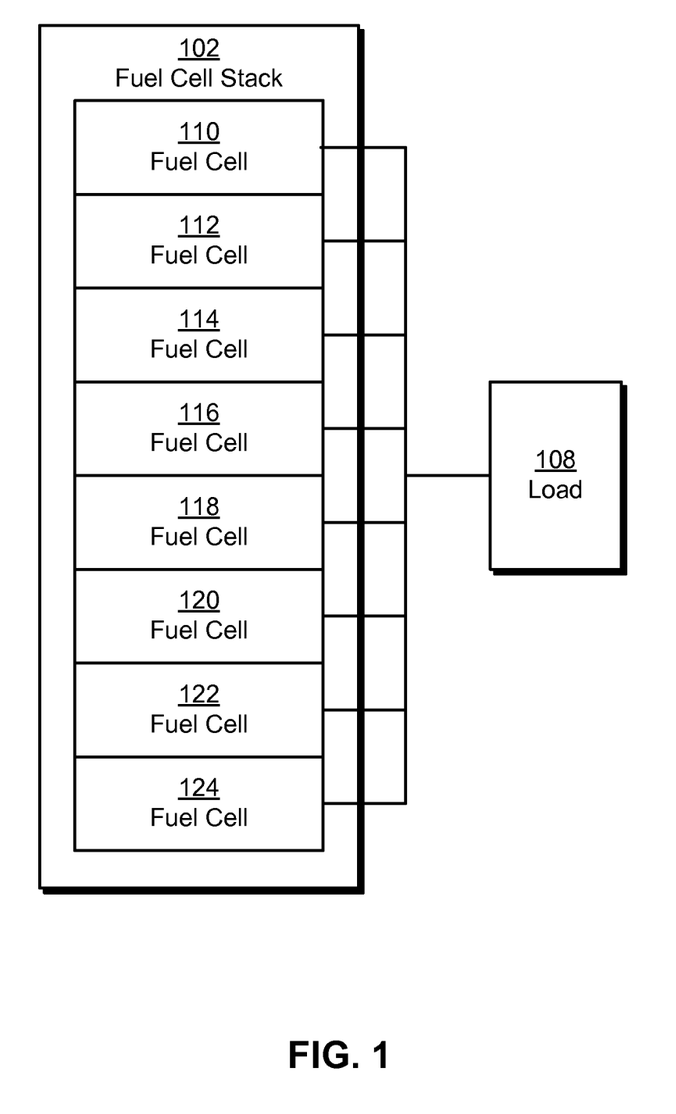
FIG. 1 shows a schematic of a system in accordance with the disclosed embodiments.

FIG. 1 shows a schematic of a system in accordance with the disclosed embodiments. The system may provide a power source to a load 108, such as a mobile phone, laptop computer, portable media player, and/or peripheral device. As shown in FIG. 1, the system includes a number of fuel cells 110-124 arranged in a fuel cell stack 102.

Fuel cells 110-124 may correspond to electrochemical cells that convert a source fuel into electric current and a waste product. In particular, fuel cells 110-124 may be proton exchange membrane (PEM) fuel cells that use hydrogen as a fuel. The hydrogen may be catalytically split into protons and electrons at the anode of each PEM fuel cell. The protons may pass through an electrically insulating membrane electrode assembly (MEA) to the cathode of the PEM fuel cell, while the electrons may travel through a load 108 to the cathode. The protons and electrons may then react with oxygen atoms at the cathode to form water molecules as a waste product. Alternatively, fuel cells 110-124 may correspond to solid oxide fuel cells, molten carbonate fuel cells, direct methanol fuel cells, alkaline fuel cells, phosphoric acid fuel cells, and/or other types of fuel cells.

Because individual fuel cells 110-124 may generate a voltage (e.g., 0.5-0.7 volts for PEM fuel cells) that is too low to drive most components (e.g., processors, peripheral devices, backlights, displays, Universal Serial Bus (USB) ports, etc.) in load 108, fuel cells 110-124 may be electrically connected in a series configuration. For example, a set of 25 PEM fuel cells may be connected in series within fuel cell stack 102 to increase the voltage of fuel cell stack 102 to roughly 12.5-17.5 volts. The increased voltage may then be used to drive components with operating voltages at or below the voltage of fuel cell stack 102.

Furthermore, fuel cells 110-124 may be assembled into fuel cell stack 102 to conserve space and/or provide a packaged power source for driving load 108. To form fuel cells 110-124 within fuel cell stack 102, layers of MEA may be sandwiched between a set of stacked bipolar plates. Each bipolar plate may include one side that functions as a cathode for one fuel cell and another side that functions as an anode for an adjacent fuel cell.

The cathode side of the bipolar plate may be corrugated or otherwise physically and/or chemically treated to facilitate a relatively uniform distribution of oxygen across the plate. The oxygen may then combine with the protons that have passed through the MEA and the electrons that have traveled through load 108 to form water, a waste product. The anode side of the bipolar plate may be smooth or otherwise physically and/or chemically treated to facilitate a relatively uniform distribution of hydrogen across the plate. For example, uniform hydrogen distribution may be facilitated by the etching of narrow and/or shallow channels into the anode side of a bipolar plate. In addition, the bipolar plate may be made from a conductive, corrosion-resistant material such as stainless steel to enable the electrodes to conduct electric current while resisting corrosion from water vapor at the cathode.

However, the creation of fuel cells 110-124 from bipolar plates made of high-density materials such as stainless steel may increase the size, weight, and/or cost of fuel cell stack 102. For example, stainless steel bipolar plates may be responsible for 80% of the weight and 30% of the cost of fuel cell stack 102. As a result, fuel cell stack 102 may be difficult to use in portable applications (e.g., powering portable electronic devices).

To facilitate the use of fuel cell stacks as power sources for portable electronic devices, the disclosed embodiments provide a reduced-weight fuel cell plate that is lighter, less resistive, and/or more thermally conductive than comparable bipolar plates made of high-density materials. Because fuel cell stacks containing the reduced-weight fuel cell plate have similar weight savings over fuel cell stacks containing heavier bipolar plates, the lighter fuel cell stacks may be more suitable for use as power sources for portable electronic devices. As discussed below, the lowered resistance and/or increased thermal conductivity may further facilitate the parallel connection of fuel cells 110-124 while improving the consistency of operation, power density, and/or acoustic noise of fuel cell stack 102.

Figure 2:
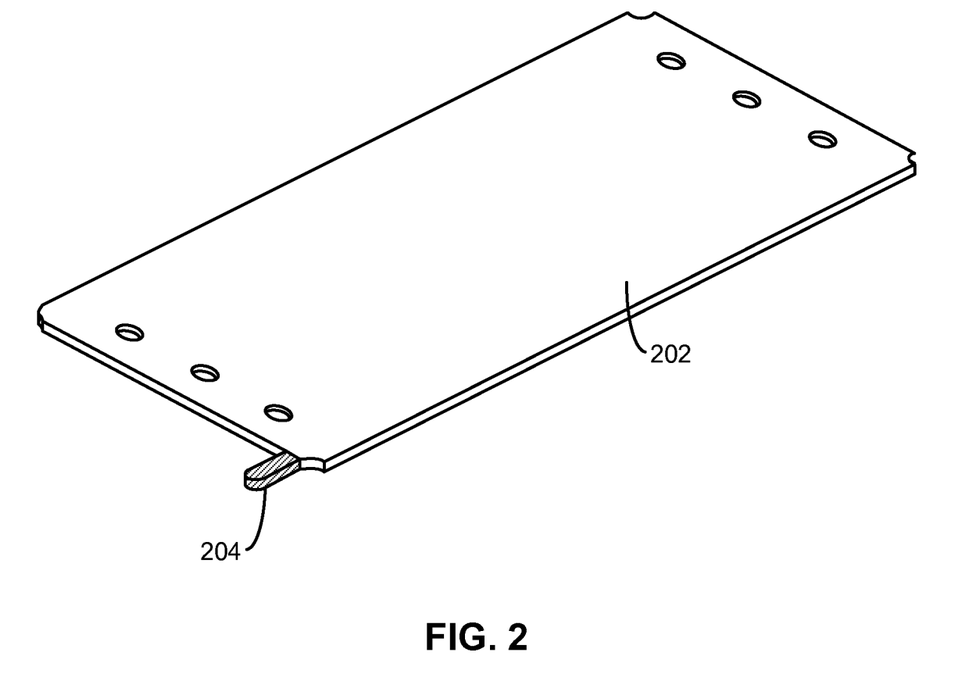
FIG. 2 shows a fuel cell plate in accordance with the disclosed embodiments.

As shown in FIG. 2, the fuel cell plate includes two portions 202-204. Portion 202 may correspond to an electrode for a fuel cell, such as a PEM fuel cell. For example, the top of portion 202 may provide an anode for a fuel cell, while the bottom of portion 202 may be corrugated to provide a cathode for an adjacent fuel cell.

Portion 204 may correspond to a solder tab for the fuel cell plate. In particular, portion 204 may be soldered to a printed circuit board (PCB) to allow electric current to flow between portion 202 and the PCB. The electric current may then be used to power a load (e.g., load 108 of FIG. 1) and/or monitor the health of the fuel cell stack containing the fuel cell plate. For example, a component on the PCB may use the electrical connection between portion 202 and the PCB to monitor the voltage of a fuel cell containing portion 202. The component may also use the monitored voltage to improve reliability in the fuel cell stack. In particular, changes in the voltage may alert the component to degradation in the fuel cell and allow the component to remedy the degradation before the fuel cell fails and disables the fuel cell stack.

As mentioned previously, the fuel cell plate may be made from an electrically conductive, corrosion-resistant material such as stainless steel. On the other hand, the low solderability of stainless steel may be incompatible with the use of portion 202 as a solder tab. As a result, portions 202-204 may utilize different materials to perform their respective functions. For example, stainless steel may be used to enhance the corrosion resistance of portion 202, while copper may be used to facilitate the creation of a reliable solder joint between portion 204 and the PCB.

In addition, the use of other materials in the fuel cell plate may reduce the weight and/or resistance of the fuel cell plate while maintaining the functionality of portions 202-204. More specifically, a variety of materials with different material properties may be layered and/or bonded to form the fuel cell plate. As shown in the cross-sectional view of FIG. 3, the fuel cell plate includes a layer of substrate 302, a first outer layer 304, and a second outer layer 306. The fuel cell plate may also include a first coating 308 over an outer surface of first outer layer 304 and a second coating 310 over an outer surface of second outer layer 306. First outer layer 304 and first coating 310 may be in portion 202, while second outer layer 306 and second coating 310 may be in portion 204.

First and second outer layers 304-306 and first and second coatings 308-310 may include material properties that facilitate the respective uses of portions 202-204. As discussed above, portion 202 may correspond to a cathode and/or an anode for a fuel cell. Consequently, a conductive, corrosion-resistant material such as stainless steel or titanium may be used in first outer layer 304 to provide corrosion resistance to water vapor generated during fuel cell operation. The corrosion resistance of portion 202 may be extended with a coating first 308 of a material that is more corrosion resistant than the material of first outer layer 304, such as titanium nitride and/or gold. As discussed below with respect to FIGS. 4-5, coating first 308 may also be applied to an exposed edge of substrate 302 to prevent substrate 302 from coming into direct contact with water.

Figure 3:
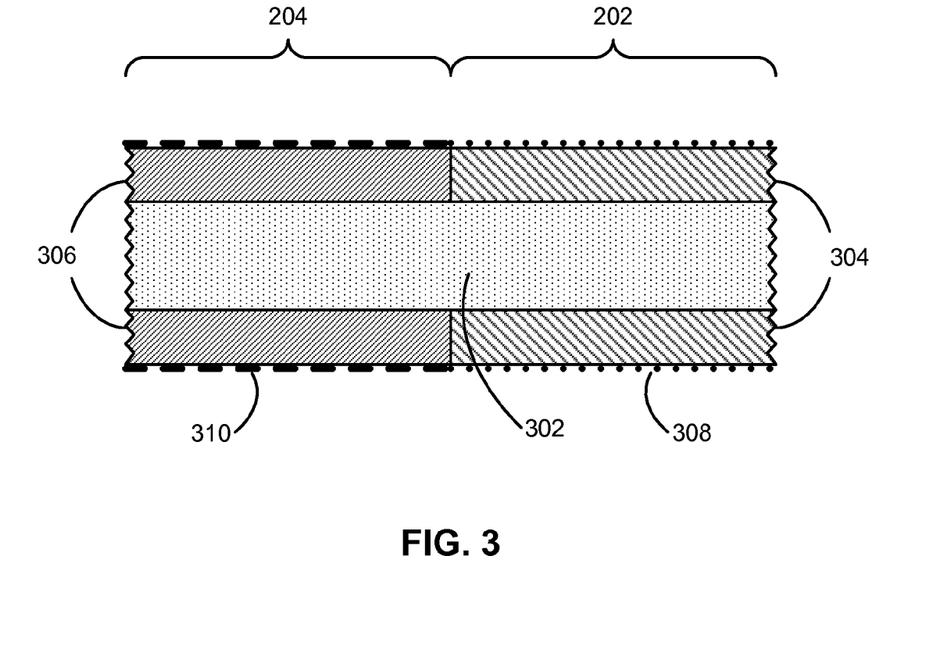
FIG. 3 shows a cross-sectional view of a fuel cell plate in accordance with the disclosed embodiments.

On the other hand, portion 204 may function as a solder tab. As a result, second outer layer 306 may be made of a solderable material such as copper, beryllium copper, and/or nickel silver. Because second outer layer 306 may have low corrosion resistance, a second coating 310 of a solderable, corrosion-resistant material such as tin or gold may be used to minimize corrosion of second outer layer 306 before the solder operation.

To reduce weight and/or resistance in the fuel cell plate, substrate 302 may contain an electrically conductive material that is lighter than the corrosion-resistant material of first outer layer 304. For example, a grade 316L stainless steel outer layer may be used with a substrate such as aluminum, beryllium, beryllium aluminum, and/or beryllium copper to create a fuel cell plate that is lighter, less resistive, and/or more thermally conductive than a fuel cell plate containing only stainless steel. Additional savings in weight and/or resistance may be achieved by forming holes, channels, and/or cavities within substrate 302. For example, gaps in substrate 302 may be created by placing multiple non-touching and/or partially touching pieces of aluminum in between two sheets of stainless steel.

In one or more embodiments, the fuel cell plate is created by bonding outer layers 304-306 to substrate 302 and applying coatings 308-310 over outer layers 304-306. In particular, a cladding technique, sputtering technique, spraying technique, and/or plating technique may be used to fuse the surfaces of outer layers 304-306 to substrate 302 and/or deposit coatings 308-310 onto outer layers 304-306. As discussed below with respect to FIG. 4, an efficient manufacturing process for the fuel cell plate may be enabled through the targeted and/or concurrent execution of one or more techniques.

Figure 4:
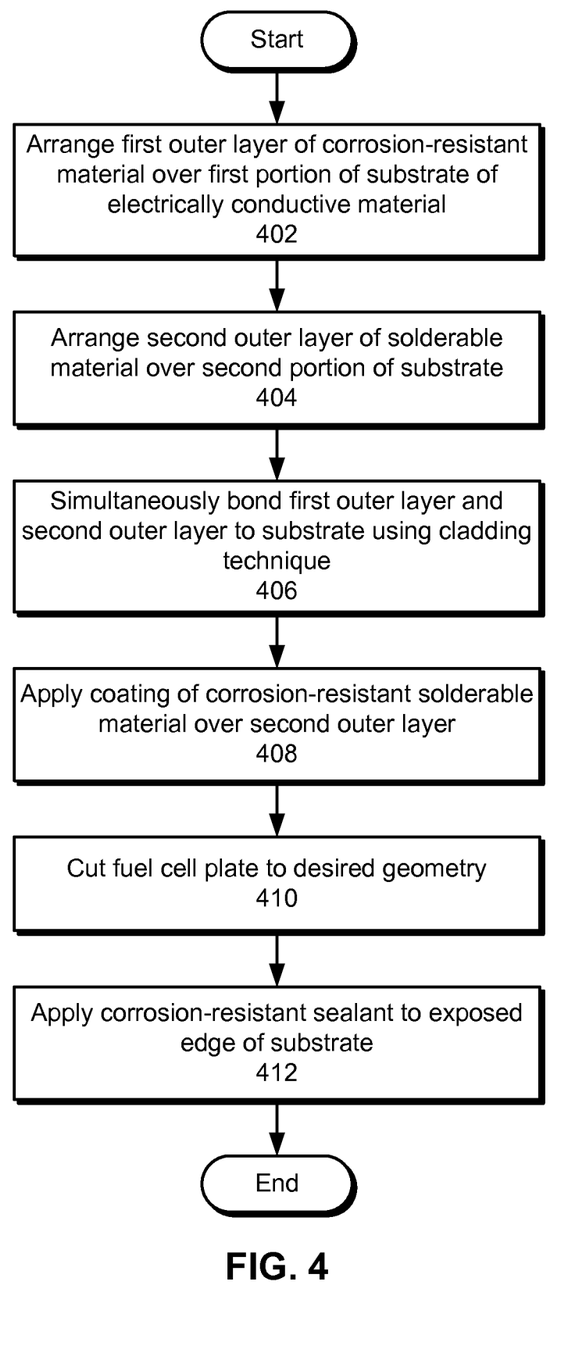
FIG. 4 shows a flowchart illustrating the process of manufacturing a fuel cell plate in accordance with the disclosed embodiments.

FIG. 4 shows a flowchart illustrating the process of manufacturing a fuel cell plate in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

To begin with, a first outer layer of corrosion-resistant material is arranged over a first portion of a substrate of electrically conductive material (operation 402) that is lighter than the corrosion-resistant material, and a second outer layer of solderable material is arranged over a second portion of the substrate (operation 404). The first portion of the substrate and the first outer layer may correspond to an electrode for a fuel cell, while the second portion of the substrate and the second outer layer may correspond to a solder tab for the fuel cell plate. Next, the first outer layer and the second outer layer are simultaneously bonded to the substrate using a cladding technique (operation 406). The cladding technique may bond the outer layers to the substrate by pressing or rolling the layers together under high pressure.

For example, a sheet of grade 316L stainless steel may be placed side-by-side with a narrow sheet of copper so that the edges of the two sheets are touching. The two sheets of metal may then be pressed and/or rolled to fuse the joint line between the sheets. Alternatively, intimate contact between the edges may be established with a welding technique, such as electron beam welding, friction stir welding, ultrasonic welding, laser welding, and/or resistance welding. A sheet of aluminum may be placed on top of the joined sheets, and another joined sheet of aluminum and copper may be placed on top of the aluminum. In other words, the joined sheets of stainless steel and copper may correspond to outer layers that flank an aluminum substrate. Finally, the three sheets may be rolled under high pressure to bond the stainless steel and copper to the aluminum. Methodical application of cladding may thus facilitate the efficient manufacturing of the fuel cell plate by enabling the simultaneous bonding of two separate outer layers to different parts of a substrate.

After the outer layers are bonded to the substrate, the corrosion resistance of the fuel cell plate may be increased by applying a coating of corrosion-resistant solderable material over the second outer layer (operation 408). Moreover, the coating may be applied during the cladding technique to further facilitate the efficient creation of the fuel cell plate. Continuing with the above example, a corrosion-resistant coating of tin may be deposited over the copper outer layer using a laser-cladding technique immediately after the sheets are clad by a roller.

The fuel cell plate is then cut to the desired geometry (operation 410). For example, the fuel cell plate may be cut out of a rectangular sheet of layered metal into the shape shown in FIG. 2. Surface features such as grooves, dimples, and/or channels may also be added to one or both sides of the fuel cell plate to facilitate use of the fuel cell plate as an electrode in a fuel cell. Along the same lines, holes may be drilled through the fuel cell plate to enable mounting of the fuel cell plate and/or facilitate draining or evaporation of water vapor during fuel cell operation.

Finally, a corrosion-resistant sealant may be applied to an exposed edge of the substrate (operation 410) to seal the substrate within one or more corrosion-resistant layers. The exposed edge may be found along the perimeter of the fuel cell plate and/or around one or more holes that span the thickness (e.g., layers) of the fuel cell plate. To apply the corrosion-resistant sealant, a welding technique, molding technique, and/or coating technique may be used. For example, a strip of corrosion-resistant material (e.g., stainless steel) may be welded around the perimeter of the fuel cell plate. Alternatively, a coating (e.g., first coating 308 of FIG. 3) of corrosion-resistant material such as titanium nitride may be deposited over the electrode portion of the fuel cell plate, including the exposed edge of the substrate.

Figure 5:
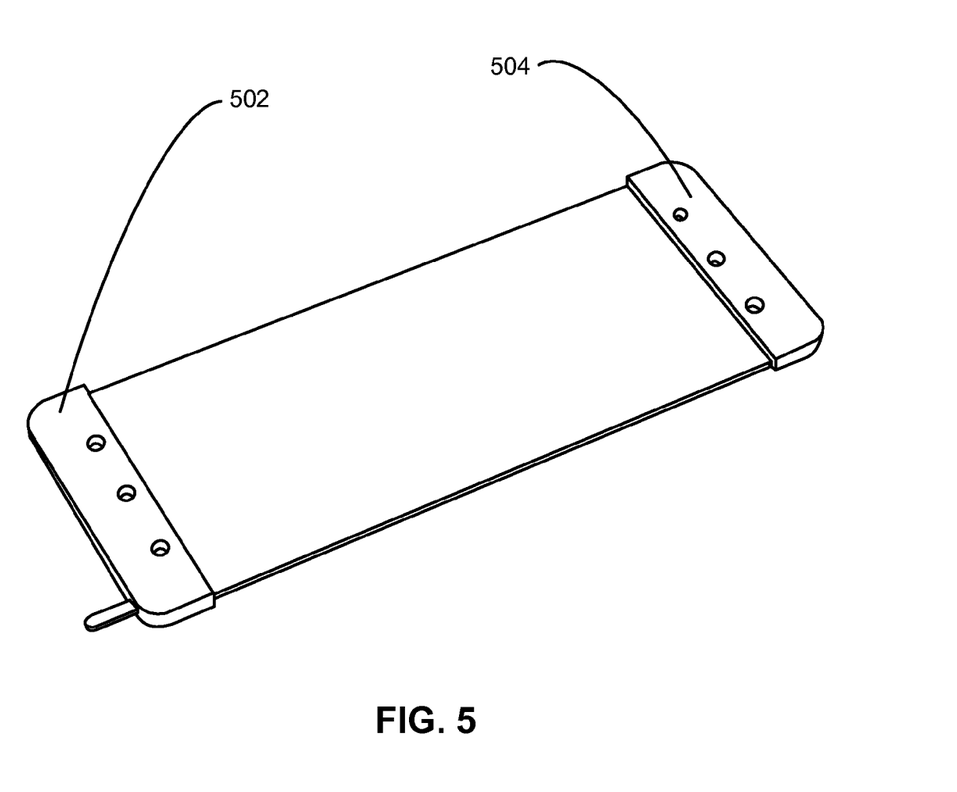
FIG. 5 shows a fuel cell plate with a co-molded gasket in accordance with the disclosed embodiments.

As shown in FIG. 5, the corrosion-resistant sealant may also be applied in the form of one or more co-molded gaskets 502-504. Gaskets 502-504 may cover one or more edges of the fuel cell plate with an elastomer such as silicone. In addition, gaskets 502-504 may be co-molded onto the fuel cell plate to seal off exposed edges of the substrate both along the perimeter of the fuel cell plate and around holes that span the layers of the fuel cell plate. Gaskets 502-504 may also include channels and/or passages to allow water vapor to escape from the surface of the fuel cell plate if the elastomer covers the cathode side of the fuel cell plate.

Figure 6:
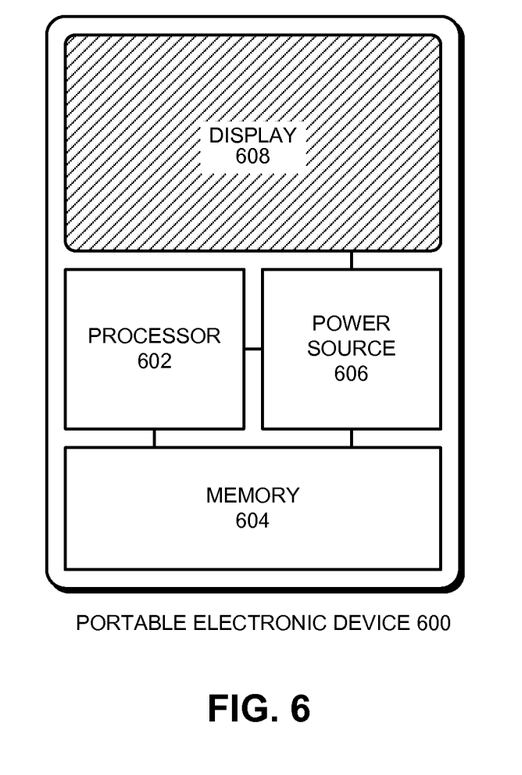
FIG. 6 shows a portable electronic device in accordance with the disclosed embodiments.

The above-described fuel cell plate can generally be used in any type of electronic device. For example, FIG. 6 illustrates a portable electronic device 600 which includes a processor 602, a memory 604 and a display 608, which are all powered by a power source 606. Portable electronic device 600 may correspond to a laptop computer, mobile phone, personal digital assistant (PDA), portable media player, digital camera, and/or other type of compact electronic device.

Power source 606 may correspond to a fuel cell stack that includes a set of fuel cell plates. Each fuel cell plate may contain a substrate of electrically conductive material and a first outer layer of corrosion-resistant material bonded to a first portion of the substrate. The fuel cell plate may also contain a second outer layer of solderable material bonded to a second portion of the substrate, a coating of corrosion-resistant solderable material over the second outer layer, and/or a corrosion-resistant sealant applied to an exposed edge of the substrate.

Because both the electrically conductive material and/or the corrosion-resistant material are chosen to be as light as practicable, the fuel cell stack may be lighter than fuel cell stacks of fuel cell plates that contain only the corrosion-resistant material. The reduced weight may additionally facilitate the use of the fuel cell stack in powering portable electronic device 600 over heavier fuel cell stacks. Furthermore, the use of materials such as aluminum for the substrate may lower the resistance and increase the thermal conductivity of the fuel cell plates over stainless steel bipolar plates. The lower resistance may reduce the electrical losses of the fuel cell stack and, in turn, facilitate the connection of the fuel cells in a parallel configuration that produces a higher amount of current than a series configuration of the same fuel cells. In addition, the increased thermal conductivity may improve the consistency of operation and/or power density of the fuel cell stack while reducing acoustic noise generated during operation of the fuel cell stack.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A fuel cell plate, comprising:
   a substrate of electrically conductive material;
   a first outer layer formed from a first outer layer material different from said electrically conductive material and adjacent a first portion of the substrate, the electrically conductive material having a lower density than the first outer layer material;
   a second outer layer formed from a solderable material different from said first outer layer material and adjacent a second portion of the substrate; and
   a first coating of corrosion-resistant material bonded to at least a portion of an outer surface of the first outer layer; and
   a second coating of solderable, corrosion-resistant material different from said first coating of corrosion-resistant material, said second coating bonded to at least a portion of an outer surface of the second outer layer.

2. The fuel cell plate of claim 1, wherein the first outer layer and the second outer layer are simultaneously bonded to the substrate using a cladding technique.

3. The fuel cell plate of claim 1, wherein the second portion of the substrate and the second outer layer correspond to a solder tab for the fuel cell plate.

4. The fuel cell plate of claim 1, wherein the first outer layer is bonded to the first portion of the substrate using at least one of a cladding technique, a sputtering technique, a spraying technique, a plating technique, and a coating technique.

5. The fuel cell plate of claim 1, wherein the first portion of the substrate and the first outer layer correspond to an electrode for a fuel cell.

6. The fuel cell plate of claim 1, further comprising:
   a corrosion-resistant sealant applied to an exposed edge of the substrate.

7. The fuel cell plate of claim 6, wherein the corrosion-resistant sealant is applied using at least one of a welding technique, a molding technique, and a coating technique.

8. A fuel cell stack, comprising:
   a second of fuel cell plates coupled together, wherein each of the fuel cell plates comprises:
   a substrate of electrically conductive material;
   a first outer layer formed from a first outer layer material different from said electrically conductive material and adjacent a first portion of the substrate, the electrically conductive material having a lower density than the first outer layer material;
   a second outer layer formed from a solderable material different from said first outer layer material and adjacent a second portion of the substrate; and
   a first coating of corrosion-resistant material bonded to at least a portion of an outer surface of the first outer layer; and
   a second coating of solderable, corrosion-resistant material different from said first coating of corrosion-resistant material, said second coating bonded to at least a portion of an outer surface of the second outer layer.

9. The fuel cell stack of claim 8, wherein the first outer layer and the second outer layer are simultaneously bonded to the substrate using a cladding technique.

10. The fuel cell stack of claim 8, wherein each of the fuel cell plates further comprises:
    a corrosion-resistant sealant applied to an exposed edge of the substrate.

11. The fuel cell stack of claim 8, wherein the first portion of the substrate and the first outer layer correspond to an electrode for a fuel cell.

12. A portable electronic device, comprising:
    a set of components powered by a fuel cell stack; and
    the fuel cell stack comprising a set of fuel cell plates coupled together, wherein each of the fuel cell plates comprises:
    a substrate of electrically conductive material;
    a first outer layer formed from a first outer layer material different from said electrically conductive material and adjacent a first portion of the substrate, the electrically conductive material having a lower density than the first outer layer material;
    a second outer layer formed from a solderable material different from said first outer layer material and adjacent a second portion of the substrate; and
    a first coating of corrosion-resistant material bonded to at least a portion of an outer surface of the first outer layer; and
    a second coating of solderable, corrosion-resistant material different from said first coating of corrosion-resistant material, said second coating bonded to at least a portion of an outer surface of the second outer layer.

13. The portable electronic device of claim 12, wherein each of the fuel cell plates further comprises:
a corrosion-resistant sealant applied to an exposed edge of the substrate.

14. A method for manufacturing a fuel cell plate, comprising:
arranging a first outer layer of corrosion-resistant material over a first portion of a substrate of electrically conductive material, the electrically conductive material having a density lower than the corrosion-resistant material;
arranging a second outer layer of solderable material over a second portion of the substrate, said solderable material different from said corrosion-resistant material;
bonding the first and second outer layers to the substrate;
depositing a corrosion-resistant coating over at least a portion of the first outer layer; and
depositing a corrosion-resistant solderable coating, different from the corrosion-resistant coating on the first outer layer, over at least a portion of the second outer layer.

15. The method of claim 14, wherein the first outer layer and the second outer layer are simultaneously bonded to the substrate using a cladding technique.

16. The method of claim 15, wherein the corrosion-resistant solderable coating is applied over the second outer layer during the cladding technique.

17. The method of claim 14, further comprising: applying a corrosion-resistant sealant to an exposed edge of the substrate.

18. The method of claim 17, wherein the corrosion-resistant sealant is applied using at least one of a welding technique, a molding technique, and a coating technique.

* * * * *